US012763900B2

(12) United States Patent
Maleki et al.

(10) Patent No.: US 12,763,900 B2
(45) Date of Patent: Oct. 13, 2026

(54) METHODS OF COMPACT TRS CONFIGURATION FOR NR UE

(71) Applicant: Telefonaktiebolaget LM Ericsson (publ), Stockholm (SE)

(72) Inventors: Sina Maleki, Malmö (SE); Ali Nader, Malmö (SE); Ajit Nimbalker, Fremont, CA (US); Claes Tidestav, Bålsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 504 days.

(21) Appl. No.: 17/918,089

(22) PCT Filed: Apr. 12, 2021

(86) PCT No.: PCT/IB2021/053009
§ 371 (c)(1),
(2) Date: Oct. 10, 2022

(87) PCT Pub. No.: WO2021/205415
PCT Pub. Date: Oct. 14, 2021

(65) Prior Publication Data

US 2023/0198706 A1 Jun. 22, 2023

Related U.S. Application Data

(60) Provisional application No. 63/008,383, filed on Apr. 10, 2020.

(51) Int. Cl.
*H04L 5/00* (2006.01)

(52) U.S. Cl.
CPC .................................. *H04L 5/0051* (2013.01)

(58) Field of Classification Search
CPC ........ H04L 5/005; H04L 1/001; H04W 76/27; H04W 52/16
See application file for complete search history.

(56) References Cited

U.S. PATENT DOCUMENTS

2018/0234197 A1* 8/2018 John Wilson ......... H04L 5/0051
2019/0141734 A1* 5/2019 Lei ........................ H04W 72/23
(Continued)

FOREIGN PATENT DOCUMENTS

CN 110690947 A 1/2020
WO 2019067925 A1 4/2019
WO 2019098924 A1 5/2019

OTHER PUBLICATIONS

Spreadtrum Communications, "Remaining issues on TRS", 3GPP TSG RAN WG1, Meeting 90bis, R1-1717747, Prague, CZ, Oct. 9-13, 2017. (Year: 2017).*
(Continued)

*Primary Examiner* — Romani Ohri

(57) ABSTRACT

Methods of compact Tracking Reference Signal (TRS) configuration for New Radio (NR) User Equipment (UE) are provided. The Channel State Information Reference Signal (CSI-RS) configuration framework through which the TRS is traditionally configured in connected mode is quite hefty in terms of number of possibilities and Information Elements (IEs) included in its structures. It entails IEs that can be used for configuration of multiple sets (up to 16) of both Zero Power (ZP) and Non-Zero Power (NZP) CSI-RSs. Each of these sets can itself include configuration of up to 64 resources. In order to be able to provide TRS configuration and availability information to the UEs in Radio Resource Control (RRC) Idle/Inactive states, a compact TRS mechanism is disclosed through which the network can configure the UE with specific TRSs.

19 Claims, 17 Drawing Sheets

*NZP-CSI-RS-Resource* Information Element

```
-- ASN1START
-- TAG-NZP-CSI-RS-RESOURCE-START

NZP-CSI-RS-Resource ::=       SEQUENCE {
    nzp-CSI-RS-ResourceId         NZP-CSI-RS-ResourceId,
    resourceMapping               CSI-RS-ResourceMapping,
    powerControlOffset            INTEGER (-8..15),
    powerControlOffsetSS          ENUMERATED{db-3, db0, db3, db6}       OPTIONAL, -- Need R
    scramblingID                  ScramblingId,
    periodicityAndOffset          CSI-ResourcePeriodicityAndOffset      OPTIONAL, -- Cond PeriodicOrSemiPersistent
    qcl-InfoPeriodicCSI-RS        TCI-StateId                           OPTIONAL, -- Cond Periodic
    ...
}

-- TAG-NZP-CSI-RS-RESOURCE-STOP
-- ASN1STOP
```

(56) References Cited

U.S. PATENT DOCUMENTS

| | | | | |
|---|---|---|---|---|
| 2020/0313755 | A1* | 10/2020 | Chuang | H04L 5/0048 |
| 2020/0314749 | A1* | 10/2020 | Sarkis | H04L 5/0092 |
| 2022/0201502 | A1* | 6/2022 | Kang | H04B 7/08 |
| 2023/0133182 | A1* | 5/2023 | Matsumura | H04W 24/10 370/329 |
| 2023/0148159 | A1* | 5/2023 | Zhang | H04L 5/0094 370/329 |
| 2023/0155783 | A1* | 5/2023 | Liu | H04L 5/0053 370/329 |

OTHER PUBLICATIONS

Mediatek Inc., "On remaining details of TRS", 3GPP TSG-RAN WG1 Meeting #90bis, R1-1718352, Prague, Czech Republic, Oct. 9-Oct. 13, 2017. (Year: 2017).*

3GPP TS 38.211 V16.0.0, "3rd Generation Partnership Project; Technical Specification Group Radio Access Network; NR; Physical channels and modulation (Release 16)", Dec. 2019.

3GPP TS 38.214 V16.0.0, "3rd Generation Partnership Project; Technical Specification Group Radio Access Network; NR; Physical layer procedures for data, (Release 16)", Dec. 2019.

3GPP; 3GPP TS 38.331 V16.0.0, "3rd Generation Partnership Project; Technical Specification Group Radio Access Network; NR; Radio Resource Control (RRC) protocol specification " (Release 16) (Mar. 2020).

Ericsson, "Provisioning of TRS occasions to Idle/Inactive UEs", 3GPP TSG RAN WG1 #104-e. Tdoc R1-2101556, e-Meeting, Jan. 25-Feb. 5, 2021.

Spreadtrum Communications, "Remaining issues on TRS", 3GPP TSG RAN WG1, Meeting 90bis, R1-1717747, Prague, CZ, Oct. 9-13, 2017.

Dong et al., "Analysis of the Impact of 5G New Air Port BWP Characteristics on Terminals", Proceedings of the 5G Network Innovation Seminar, 2018.

Mediatek Inc., "On remaining details of TRS", 3GPP TSG-RAN WG1 Meeting #90bis, R1-1718352, Prague, Czech Republic, Oct. 9-Oct. 13, 2017.

* cited by examiner

*NZP-CSI-RS-Resource* Information Element

```
-- ASN1START
-- TAG-NZP-CSI-RS-RESOURCE-START

NZP-CSI-RS-Resource ::=      SEQUENCE {
    nzp-CSI-RS-ResourceId        NZP-CSI-RS-ResourceId,
    resourceMapping              CSI-RS-ResourceMapping,
    powerControlOffset           INTEGER (-8..15),
    powerControlOffsetSS         ENUMERATED{db-3, db0, db3, db6}     OPTIONAL, -- Need R
    scramblingID                 ScramblingId,
    periodicityAndOffset         CSI-ResourcePeriodicityAndOffset    OPTIONAL, -- Cond PeriodicOrSemiPersistent
    qcl-InfoPeriodicCSI-RS       TCI-StateId                         OPTIONAL, -- Cond Periodic
    ...
}

-- TAG-NZP-CSI-RS-RESOURCE-STOP
-- ASN1STOP
```

*FIG. 1*

*NZP-CSI-RS-ResourceId* Information Element

```
-- ASN1START
-- TAG-NZP-CSI-RS-RESOURCEID-START

NZP-CSI-RS-ResourceId ::=           INTEGER (0..maxNrofNZP-CSI-RS-Resources-1)

-- TAG-NZP-CSI-RS-RESOURCEID-STOP
-- ASN1STOP
```

*FIG. 2*

*NZP-CSI-RS-ResourceSet* Information Element

```
-- ASN1START
-- TAG-NZP-CSI-RS-RESOURCESET-START
NZP-CSI-RS-ResourceSet ::=  SEQUENCE {
    nzp-CSI-ResourceSetId      NZP-CSI-RS-ResourceSetId,
    nzp-CSI-RS-Resources       SEQUENCE (SIZE (1..maxNrofNZP-CSI-RS-ResourcesPerSet)) OF NZP-CSI-RS-ResourceId,
    repetition                 ENUMERATED { on, off }      OPTIONAL,   -- Need S
    aperiodicTriggeringOffset  INTEGER(0..6)               OPTIONAL,   -- Need S
    trs-Info                   ENUMERATED {true}           OPTIONAL,   -- Need R
    ...
}

-- TAG-NZP-CSI-RS-RESOURCESET-STOP
-- ASN1STOP
```

*FIG. 3*

***NZP-CSI-RS-ResourceSetId* Information Element**

```
-- ASN1START
-- TAG-NZP-CSI-RS-RESOURCESETID-START

NZP-CSI-RS-ResourceSetId ::=        INTEGER (0..maxNrofNZP-CSI-RS-ResourceSets-1)

-- TAG-NZP-CSI-RS-RESOURCESETID-STOP
```

*FIG. 4*

***CSI-ResourceConfig* Information Element**

```
-- ASN1START
-- TAG-CSI-RESOURCECONFIG-START

CSI-ResourceConfig ::=    SEQUENCE {
    csi-ResourceConfigId      CSI-ResourceConfigId,
    csi-RS-ResourceSetList    CHOICE {
        nzp-CSI-RS-SSB            SEQUENCE {
            nzp-CSI-RS-ResourceSetList SEQUENCE (SIZE (1..maxNrofNZP-CSI-RS-ResourceSetsPerConfig)) OF NZP-CSI-
RS-ResourceSetId       OPTIONAL, -- Need R
            csi-SSB-ResourceSetList    SEQUENCE (SIZE (1..maxNrofCSI-SSB-ResourceSetsPerConfig)) OF CSI-SSB-
ResourceSetId          OPTIONAL  -- Need R
        },
        csi-IM-ResourceSetList    SEQUENCE (SIZE (1..maxNrofCSI-IM-ResourceSetsPerConfig)) OF CSI-IM-
ResourceSetId
    },

    bwp-Id                    BWP-Id,
    resourceType              ENUMERATED { aperiodic, semiPersistent, periodic },
    ...
}

-- TAG-CSI-RESOURCECONFIG-STOP
-- ASN1STOP
```

*FIG. 5*

*CSI-ResourceConfigId* Information Element

```
-- ASN1START
-- TAG-CSI-RESOURCECONFIGID-START

CSI-ResourceConfigId ::=            INTEGER (0..maxNrofCSI-ResourceConfigurations-1)

-- TAG-CSI-RESOURCECONFIGID-STOP
-- ASN1STOP
```

*FIG. 6*

*CSI-ResourcePeriodicityAndOffset* Information Element

```
-- ASN1START
-- TAG-CSI-RESOURCEPERIODICITYANDOFFSET-START

CSI-ResourcePeriodicityAndOffset ::=    CHOICE {
    slots4                              INTEGER (0..3),
    slots5                              INTEGER (0..4),
    slots8                              INTEGER (0..7),
    slots10                             INTEGER (0..9),
    slots16                             INTEGER (0..15),
    slots20                             INTEGER (0..19),
    slots32                             INTEGER (0..31),
    slots40                             INTEGER (0..39),
    slots64                             INTEGER (0..63),
    slots80                             INTEGER (0..79),
    slots160                            INTEGER (0..159),
    slots320                            INTEGER (0..319),
    slots640                            INTEGER (0..639)
}

-- TAG-CSI-RESOURCEPERIODICITYANDOFFSET-STOP
-- ASN1STOP
```

*FIG. 7*

*CSI-RS-ResourceMapping* Information Element

```
-- ASN1START
-- TAG-CSI-RS-RESOURCEMAPPING-START

CSI-RS-ResourceMapping ::=     SEQUENCE {
    frequencyDomainAllocation      CHOICE {
        row1                           BIT STRING (SIZE (4)),
        row2                           BIT STRING (SIZE (12)),
        row4                           BIT STRING (SIZE (3)),
        other                          BIT STRING (SIZE (6))
    },
    nrofPorts                      ENUMERATED {p1,p2,p4,p8,p12,p16,p24,p32},
    firstOFDMSymbolInTimeDomain    INTEGER (0..13),
    firstOFDMSymbolInTimeDomain2   INTEGER (2..12)                                        OPTIONAL, -- Need R
    cdm-Type                       ENUMERATED {noCDM, fd-CDM2, cdm4-FD2-TD2, cdm8-FD2-TD4},
    density                        CHOICE {
        dot5                           ENUMERATED {evenPRBs, oddPRBs},
        one                            NULL,
        three                          NULL,
        spare                          NULL
    },
    freqBand                       CSI-FrequencyOccupation,
    ...
}

-- TAG-CSI-RS-RESOURCEMAPPING-STOP
-- ASN1STOP
```

*FIG. 8*

***CSI-FrequencyOccupation* Information Element**

```
-- ASN1START
-- TAG-CSI-FREQUENCYOCCUPATION-START

CSI-FrequencyOccupation ::=         SEQUENCE {
    startingRB                          INTEGER (0..maxNrofPhysicalResourceBlocks-1),
    nrofRBs                             INTEGER (24..maxNrofPhysicalResourceBlocksPlus1),
    ...
}

-- TAG-CSI-FREQUENCYOCCUPATION-STOP
-- ASN1STOP
```

*FIG. 9*

***TRS-Config* Information Element**

```
-- ASN1START
-- TAG-TRS-CONFIG-START

TRS-Config ::=              SEQUENCE {
    bwp-Id                      BWP-Id,                                                     OPTIONAL,   -- Need S
    aperiodicTriggeringOffset           INTEGER(0..6),
    firstOFDMSymbolInTimeDomain         INTEGER (0..9),
    freqBand        SEQUENCE {
        startingRB                          INTEGER (0..maxNrofPhysicalResourceBlocks-1),
        nrofRBs                             INTEGER (24..maxNrofPhysicalResourceBlocksPlus1),
    ...
}
OPTIONAL,
        powerControlOffsetSS                ENUMERATED{db-3, db0, db3, db6}         OPTIONAL,   -- Need R
    scramblingID                        ScramblingId,                               OPTIONAL,
    periodicityAndOffset::=
        slots10                             INTEGER (0..9),
        slots20                             INTEGER (0..19),
        slots40                             INTEGER (0..39),
        slots80                             INTEGER (0..79),
        slots160                            INTEGER (0..159),
        slots320                            INTEGER (0..319),
        slots640                            INTEGER (0..639)
}
    qcl-InfoPeriodicCSI-RS            CHOICE {TCI-StateId, SSB-Index}             OPTIONAL,   -- Cond Periodic
    RRC-state ENUMERATED {Connected, Idle, Inactive}
...
}

-- TAG- TRS-CONFIG-STOP
-- ASN1STOP
```

*FIG. 11*

***TRS-Config* Information Element**

```
-- ASN1START
-- TAG-TRS-CONFIG-START

TRS-Config ::=             SEQUENCE {
    firstOFDMSymbolInTimeDomain         INTEGER (0..9),
    freqBand        SEQUENCE {
        startingRB                          INTEGER (0..maxNrofPhysicalResourceBlocks-1),
        nrofRBs                             INTEGER (24..maxNrofPhysicalResourceBlocksPlus1),
    ...
}
OPTIONAL,
        powerControlOffsetSS                ENUMERATED{db-3, db3, db6}
DEFAULT db0,
    periodicityAndOffset::=
        slots10                             INTEGER (0..9),
        slots20                             INTEGER (0..19),
        slots40                             INTEGER (0..39),
        slots80                             INTEGER (0..79),
        slots160                            INTEGER (0..159),
        slots320                            INTEGER (0..319),
        slots640                            INTEGER (0..639)
}
    qcl-InfoPeriodicCSI-RS             SSB-Index,
...
}

-- TAG- TRS-CONFIG-STOP
-- ASN1STOP
```

*FIG. 12*

METHODS OF COMPACT TRS CONFIGURATION FOR NR UE

RELATED APPLICATIONS

This application is a national phase application of International Patent Application No. PCT/IB2021/053009, filed Apr. 12, 2021, which claims the benefit of U.S. Provisional Patent Application No. 63/008,383, filed Apr. 10, 2020, the disclosure of which are hereby incorporated herein by reference in their entirety.

TECHNICAL FIELD

The present disclosure is related to Tracking Reference Signal (TRS) configuration in wireless communication systems.

BACKGROUND

The Third Generation Partnership Project (3GPP) is defining technical specifications for New Radio (NR) (e.g., Fifth Generation (5G)). In Release 15 (Rd-15) NR, a User Equipment (UE) can be configured with up to four carrier Bandwidth (BW) Parts (BWPs) in the Downlink (DL) with a single DL carrier BWP being active at a given time. A UE can be configured with up to four carrier BWPs in the Uplink (UL) with a single UL carrier BWP being active at a given time. If a UE is configured with a supplementary UL, the UE can additionally be configured with up to four carrier BWPs in the supplementary UL with a single supplementary UL carrier BWP being active at a given time.

For a carrier BWP with a given numerology $\mu_1$, a contiguous set of Physical Resource Blocks (PRBs) are defined and numbered from 0 to $$N_{BWP,i}^{size} - 1,$$

where i is the index of the carrier BWP. A Resource Block (RB) is defined as 12 consecutive subcarriers in the frequency domain.

Multiple Orthogonal Frequency-Division Multiplexing (OFDM) numerologies, μ, are supported in NR as given by Table 1, where the subcarrier spacing, Δf, and the cyclic prefix for a carrier BWP are configured by different higher layer parameters for DL and UL, respectively.

TABLE 1

Supported transmission numerologies.

| μ | $\Delta f = 2^{\mu} * 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Physical Channels

A DL physical channel corresponds to a set of resource elements carrying information originating from higher layers. The following DL physical channels are defined:

Physical DL Shared Channel (PDSCH)
Physical Broadcast Channel (PBCH)
Physical DL Control Channel (PDCCH)

PDSCH is the main physical channel used for unicast DL data transmission, but also for transmission of Random Access Response (RAR), certain system information blocks, and paging information. PBCH carries the basic system information, required by the UE to access the network. PDCCH is used for transmitting DL Control Information (DCI), mainly scheduling decisions, required for reception of PDSCH, and for UL scheduling grants enabling transmission on PUSCH.

An UL physical channel corresponds to a set of resource elements carrying information originating from higher layers. The following UL physical channels are defined:

Physical UL Shared Channel (PUSCH)
Physical UL Control Channel (PUCCH)
Physical Random Access Channel (PRACH)

PUSCH is the UL counterpart to the PDSCH. PUCCH is used by UEs to transmit UL control information, including HARQ acknowledgements, channel state information reports, etc. PRACH is used for random access preamble transmission.

NR Reference Symbols

The ultra-lean design principle in NR aims to minimize the always-on transmissions that exist in earlier systems (e.g., Long Term Evolution (LTE) Cell-Specific Reference Signal (CRS) reference symbols). Instead, NR provides reference symbols such as Synchronization Signal (SS) Blocks (SSBs) on a periodic basis, by default once every 20 milliseconds (ms). In addition, for connected mode UEs, typically a set of reference symbols are provided for optimal link performance Some of these reference symbols are clarified below.

Channel State Information Reference Signal (CSI-RS) for Tracking

A UE in Radio Resource Control (RRC) connected mode is expected to receive from the network the RRC layer UE specific configuration of a NZP-CSI-RS-ResourceSet configured including the parameter trs-Info (e.g., a parameter for a Tracking Reference Signal (TRS)). For a NZP-CSI-RS-ResourceSet configured with the higher layer parameter trs-Info set to "true", the UE shall assume the antenna port with the same port index of the configured Non-Zero Power (NZP) CSI-RS resources in the NZP-CSI-RS-ResourceSet is the same.

- For Frequency Range 1 (FR1), the UE may be configured with one or more NZP CSI-RS set(s), where a NZP-CSI-RS-ResourceSet consists of four periodic NZP CSI-RS resources in two consecutive slots with two periodic NZP CSI-RS resources in each slot. If no two consecutive slots are indicated as DL slots by tdd-UL-DL-ConfigurationCommon or tdd-UL-DL-ConfigDedicated, then the UE may be configured with one or more NZP CSI-RS set(s), where a NZP-CSI-RS-ResourceSet consists of two periodic NZP CSI-RS resources in one slot.
- For Frequency Range 2 (FR2), the UE may be configured with one or more NZP CSI-RS set(s), where a NZP-CSI-RS-ResourceSet consists of two periodic CSI-RS resources in one slot or with a NZP-CSI-RS-Resource-Set of four periodic NZP CSI-RS resources in two consecutive slots with two periodic NZP CSI-RS resources in each slot.

A UE configured with NZP-CSI-RS-ResourceSet(s) configured with higher layer parameter trs-Info may have the CSI-RS resources configured as:

- Periodic, with the CSI-RS resources in the NZP-CSI-RS-ResourceSet configured with same periodicity, bandwidth and subcarrier location.
- Periodic CSI-RS resource in one set and aperiodic CSI-RS resources in a second set, with the aperiodic CSI-RS and periodic CSI-RS resource having the same bandwidth (with same RB location) and the aperiodic CSI-RS being 'QCL-Type-A' and 'QCL-TypeD', where applicable, with the periodic CSI-RS resources. For FR2, the UE does not expect that the scheduling offset between the last symbol of the PDCCH carrying the triggering DCI and the first symbol of the aperiodic CSI-RS resources is smaller than the UE reported ThresholdSched-Offset. The UE shall expect that the periodic CSI-RS resource set and aperiodic CSI-RS resource set are configured with the same number of CSI-RS resources and with the same number of CSI-RS resources in a slot. For the aperiodic CSI-RS resource set if triggered, and if the associated periodic CSI-RS resource set is configured with four periodic CSI-RS resources with two consecutive slots with two periodic CSI-RS resources in each slot, the higher layer parameter aperiodicTriggeringOffset indicates the triggering offset for the first slot for the first two CSI-RS resources in the set.

A UE does not expect to be configured with a CSI-ReportConfig that is linked to a CSI-ResourceConfig containing an NZP-CSI-RS-ResourceSet configured with trs-Info and with the CSI-ReportConfig configured with the higher layer parameter timeRestrictionForChannelMeasurements set to 'configured'.

A UE does not expect to be configured with a CSI-ReportConfig with the higher layer parameter reportQuantity set to other than 'none' for aperiodic NZP CSI-RS resource set configured with trs-Info.

A UE does not expect to be configured with a CSI-ReportConfig for periodic NZP CSI-RS resource set configured with trs-Info.

A UE does not expect to be configured with a NZP-CSI-RS-ResourceSet configured both with trs-Info and repetition.

Each CSI-RS resource, defined in Clause 7.4.1.5.3 of Technical Specification (TS) 38.211, is configured by the higher layer parameter NZP-CSI-RS-Resource with the following restrictions:

The time-domain locations of the two CSI-RS resources in a slot, or of the four CSI-RS resources in two consecutive slots (which are the same across two consecutive slots), as defined by higher layer parameter CSI-RS-resourceMapping, is given by one of

- $l\in\{4,8\}$, $l\in\{5,9\}$, or $l\in\{6,10\}$ for FR1 and FR2,
- $l\in\{0,4\}$, $l\in\{1,5\}$, $l\in\{2,6\}$, $l\in\{3,7\}$, $l\in\{7,11\}$, $l\in\{3,12\}$ or $l\in\{9,13\}$ for FR2.
- A single port CSI-RS resource with density ρ=3 given by Table 7.4.1.5.3-1 from TS 38.211 and higher layer parameter density configured by CSI-RS-ResourceMapping.
- The bandwidth of the CSI-RS resource, as given by the higher layer parameter freqBand configured by CSI-RS-ResourceMapping, is the minimum of 52 and $$N_{BWP,i}^{size}$$

RBs, or is equal to $$N_{BWP,i}^{size}$$

RBs. For operation with shared spectrum channel access, freqBand configured by CSI-RS-ResourceMapping, is the minimum of 48 and $$N_{BWP,i}^{size}$$

RBs, or is equal to $$N_{BWP,i}^{size}$$

RBs.

- The UE is not expected to be configured with the periodicity of $2^{\mu}\times 10$ slots if the bandwidth of CSI-RS resource is larger than 52 RBs.
- The periodicity and slot offset for periodic NZP CSI-RS resources, as given by the higher layer parameter periodicityAndOffset configured by NZP-CSI-RS-Resource, is one of $2^{\mu}X_p$ slots where $X_p$=10, 20, 40, or 80 and where μ is defined in Clause 4.3 of TS 38.211.
- Same powerControlOffset and powerControlOffsetSS given by NZP-CSI-RS-Resource value across all resources.

NZP CSI-RS

The UE can be configured with one or more NZP CSI-RS resource set configuration(s) as indicated by the higher layer parameters CSI-ResourceConfig, and NZP-CSI-RS-ResourceSet. Each NZP CSI-RS resource set consists of K≥1 NZP CSI-RS resource(s).

The following parameters for which the UE shall assume non-zero transmission power for CSI-RS resource are configured via the higher layer parameter NZP-CSI-RS-Resource, CSI-ResourceConfig, and NZP-CSI-RS-ResourceSet for each CSI-RS resource configuration:

- nzp-CSI-RS-ResourceId determines CSI-RS resource configuration identity.
- periodicityAndOffset defines the CSI-RS periodicity and slot offset for periodic/semi-persistent CSI-RS. All the CSI-RS resources within one set are configured with the same periodicity, while the slot offset can be same or different for different CSI-RS resources.
- resourceMapping defines the number of ports, code division multiplexing (CDM)-type, and OFDM symbol and subcarrier occupancy of the CSI-RS resource within a slot that are given in Clause 7.4.1.5 of TS 38.211.
- nrofPorts in resourceMapping defines the number of CSI-RS ports, where the allowable values are given in Clause 7.4.1.5 of TS 38.211.
- density in resourceMapping defines CSI-RS frequency density of each CSI-RS port per PRB, and CSI-RS PRB offset in case of the density value of ½, where the allowable values are given in Clause 7.4.1.5 of TS 38.211. For density ½, the odd/even PRB allocation indicated in density is with respect to the Common Resource Block (CRB) grid.

cdm-Type in resourceMapping defines CDM values and pattern, where the allowable values are given in Clause 7.4.1.5 of TS 38.211.

powerControlOffset is the assumed ratio of PDSCH Energy Per Resource Element (EPRE) to NZP CSI-RS EPRE when UE derives CSI feedback and takes values in the range of [−8, 15] decibels (dB) with 1 dB step size.

powerControlOffsetSS is the assumed ratio of NZP CSI-RS EPRE to Synchronization Signal (SS)/Physical Broadcast Channel (PBCH) block EPRE.

scramblingID defines scrambling identification (ID) of CSI-RS with length of 10 bits.

BWP-Id in CSI-ResourceConfig defines which BWP the configured CSI-RS is located in.

repetition in NZP-CSI-RS-ResourceSet is associated with a CSI-RS resource set and defines whether UE can assume the CSI-RS resources within the NZP CSI-RS Resource Set are transmitted with the same DL spatial domain transmission filter or not as described in Clause 5.1.6.1.2 and can be configured only when the higher layer parameter reportQuantity associated with all the reporting settings linked with the CSI-RS resource set is set to 'cri-RSRP', 'cri-SINR' or 'none'.

qcl-InfoPeriodicCSI-RS contains a reference to a TCI-State indicating Quasi Co-Location (QCL) source RS(s) and QCL type(s). If the TCI-State is configured with reference to an RS with 'QCL-TypeD' association, that RS may be an SS/PBCH block located in the same or different Component Carrier (CC)/DL BWP or a CSI-RS resource configured as periodic located in the same or different CC/DL BWP.

trs-Info in NZP-CSI-RS-ResourceSet is associated with a CSI-RS resource set and for which the UE can assume that the antenna port with the same port index of the configured NZP CSI-RS resources in the NZP-CSI-RS-ResourceSet is the same as described in Clause 5.1.6.1.1 and can be configured when reporting setting is not configured or when the higher layer parameter reportQuantity associated with all the reporting settings linked with the CSI-RS resource set is set to 'none'.

All CSI-RS resources within one set are configured with same density and same nrofPorts, except for the NZP CSI-RS resources used for interference measurement. The UE expects that all the CSI-RS resources of a resource set are configured with the same starting RB and number of RBs and the same cdm-type.

The bandwidth and initial CRB index of a CSI-RS resource within a BWP, as defined in Clause 7.4.1.5 of TS 38.211, are determined based on the higher layer parameters nrofRBs and startingRB, respectively, within the CSI-FrequencyOccupation Information Element (IE) configured by the higher layer parameter freqBand within the CSI-RS-ResourceMapping IE. Both nrofRBs and startingRB are configured as integer multiples of 4 RBs, and the reference point for startingRB is CRB 0 on the CRB grid. If startingRB $$<N_{BWP}^{start},$$

the UE shall assume that the initial CRB index of the CSI-RS resource is $$N_{initial\,RB} = N_{BWP}^{start},$$

otherwise $N_{initial\ RB}$=startingRB. If nrofRBs $$>N_{BWP}^{size} + N_{BWP}^{start} - N_{initial\,RB},$$

the UE shall assume that the bandwidth of the CSI-RS resource is $$N_{CSI\text{-}RS}^{BW} = N_{BWP}^{size} + N_{BWP}^{start} - N_{initial\,RB},$$

otherwise $$N_{CSI\text{-}RS}^{BW} = nrofRBs.$$

In all cases, the UE shall expect that $$N_{CSI\text{-}RS}^{BW} \geq \min\left(24, N_{BWP}^{size}\right).$$

NZP-CSI-RS-Resource

FIG. 1 illustrates the NZP-CSI-RS-Resource IE. The NZP-CSI-RS-Resource IE is used to configure NZP CSI-RS transmitted in the cell where the IE is included, which the UE may be configured to measure on (see TS 38.214, clause 5.2.2.3.1). Fields for the NZP-CSI-RS-Resource IE are further described in Table 2 below.

TABLE 2

| NZP-CSI-RS-Resource field descriptions |
|---|
| periodicityAndOffset<br>Periodicity and slot offset sl1 corresponds to a periodicity of 1 slot, sl2 to a periodicity of two slots, and so on. The corresponding offset is also given in number of slots (see TS 38.214, clause 5.2.2.3.1) |
| powerControlOffset<br>Power offset of PDSCH RE to NZP CSI-RS RE. Value in dB (see TS 38.214, clauses 5.2.2.3.1 and 4.1) |
| powerControlOffsetSS<br>Power offset of NZP CSI-RS RE to SS RE. Value in dB (see TS 38.214, clause 5.2.2.3.1) |
| qcl-InfoPeriodicCSI-RS<br>For a target periodic CSI-RS, contains a reference to one TCI-State in TCI-States for providing the QCL source and QCL type. For periodic CSI-RS, the source can be SSB or another periodic-CSI-RS. Refers to the TCI-State which has this value for tci-StateId and is defined in tci-StatesToAddModList in the PDSCH-Config included in the BWP-Downlink corresponding to the |

TABLE 2-continued

| NZP-CSI-RS-Resource field descriptions |
| --- |
| serving cell and to the DL BWP to which the resource belongs to (see TS 38.214, clause 5.2.2.3.1) |
| resourceMapping |
| OFDM symbol location(s) in a slot and subcarrier occupancy in a PRB of the CSI-RS resource |
| scramblingID |
| Scrambling ID (see TS 38.214, clause 5.2.2.3.1) |

| Conditional Presence | Explanation |
| --- | --- |
| Periodic | The field is optionally present, Need M, for periodic NZP-CSI-RS-Resources (as indicated in CSI-ResourceConfig). The field is absent otherwise |
| PeriodicOrSemiPersistent | The field is mandatory present, Need M, for periodic and semi-persistent NZP-CSI-RS-Resources (as indicated in CSI-ResourceConfig). The field is absent otherwise. |

NZP-CSI-RS-ResourceId

FIG. 2 illustrates the NZP-CSI-RS-ResourceId IE. The NZP-CSI-RS-ResourceId IE is used to identify one NZP-CSI-RS-Resource.

NZP-CSI-RS-ResourceSet

FIG. 3 illustrates the NZP-CSI-RS-ResourceSet IE. The NZP-CSI-RS-ResourceSet IE is a set of NZP CSI-RS resources (their IDs) and set-specific parameters. Fields for the NZP-CSI-RS-ResourceSet IE are further described in Table 3 below.

TABLE 3

| NZP-CSI-RS-ResourceSet field descriptions |
| --- |
| aperiodicTriggeringOffset |
| Offset X between the slot containing the DCI that triggers a set of aperiodic NZP CSI-RS resources and the slot in which the CSI-RS resource set is transmitted. The value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. When the field is absent the UE applies the value 0. |
| nzp-CSI-RS-Resources |
| NZP-CSI-RS-Resources associated with this NZP-CSI-RS resource set (see TS 38.214, clause 5.2). For CSI, there are at most 8 NZP CSI RS resources per resource set |
| repetition |
| Indicates whether repetition is on/off. If the field is set to 'OFF' or if the field is absent, the UE may not assume that the NZP-CSI-RS resources within the resource set are transmitted with the same downlink spatial domain transmission filter and with same NrofPorts in every symbol (see TS 38.214, clauses 5.2.2.3.1 and 5.1.6.1.2). Can only be configured for CSI-RS resource sets which are associated with CSI-ReportConfig with report of L1 RSRP or "no report" |
| trs-Info |
| Indicates that the antenna port for all NZP-CSI-RS resources in the CSI-RS resource set is same. If the field is absent or released the UE applies the value "false" (see TS 38.214, clause 5.2.2.3.1). |

NZP-CSI-RS-ResourceSetId

FIG. 4 illustrates the NZP-CSI-RS-ResourceSetId IE. The NZP-CSI-RS-ResourceSead IE is used to identify one NZP-CSI-RS-ResourceSet.

CSI-ResourceConfig

FIG. 5 illustrates the CSI-ResourceConfig IE. The CSI-ResourceConfig IE defines a group of one or more NZP-CSI-RS-ResourceSet, CSI-IM-ResourceSet and/or CSI-SSB-ResourceSet. Fields for the CSI-ResourceConfig IE are further described in Table 4 below.

TABLE 4

| CSI-ResourceConfig field descriptions |
| --- |
| bwp-Id |
| The DL BWP which the CSI-RS associated with this CSI-ResourceConfig are located in (see TS |

TABLE 4-continued

| CSI-ResourceConfig field descriptions |
| --- |
| 38.214, clause 5.2.1.2 |
| csi-ResourceConfigId |
| Used in CSI-ReportConfig to refer to an instance of CSI-ResourceConfig |
| csi-RS-ResourceSetList |
| Contains up to maxNrofNZP-CSI-RS-ResourceSetsPerConfig resource sets if ResourceConfigType is 'aperiodic' and 1 otherwise (see TS 38.214, clause 5.2.1.2) |
| csi-SSB-ResourceSetList |
| List of SSB resources used for beam measurement and reporting in a resource set (see TS 38.214, section FFS_Section) |
| resourceType |
| Time domain behavior of resource configuration (see TS 38.214, clause 5.2.1.2). It does not apply to resources provided in the csi-SSB-ResourceSetList. |

CSI-ResourceConfigId

FIG. 6 illustrates the CSI-ResourceConfigId IE. The CSI-ResourceConfigId IE is used to identify a CSI-ResourceConfig.

CSI-ResourcePeriodicityAndOffset

FIG. 7 illustrates the CSI-ResourcePeriodicityAndOffset IE. The CSI-ResourcePeriodicityAndOffset IE is used to configure a periodicity and a corresponding offset for periodic and semi-persistent CSI resources, and for periodic and semi-persistent reporting on PUCCH. Both the periodicity and the offset are given in number of slots. The periodicity value slots4 corresponds to 4 slots, slots5 corresponds to 5 slots, and so on.

CSI-RS-ResourceMapping

FIG. 8 illustrates the CSI-RS-ResourceMapping IE. The CSI-RS-ResourceMapping IE is used to configure the resource element mapping of a CSI-RS resource in time- and frequency domain Fields for the CSI-RS-ResourceMapping are further described in Table 5 below.

TABLE 5

| CSI-RS-ResourceMapping field descriptions |
| --- |
| cdm-Type |
| CDM type (see TS 38.214, clause 5.2.2.3.1). |
| density |
| Density of CSI-RS resource measured in RE/port/PRB (see TS 38.211, clause 7.4.1.5.3). |
| Values 0.5 (dot5), 1 (one) and 3 (three) are allowed for X = 1, values 0.5 (dot5) and 1 (one) are allowed for X = 2, 16, 24 and 32, value 1 (one) is allowed for X = 4, 8, 12. |
| For density = 1/2, includes 1-bit indication for RB level comb offset indicating whether odd or even RBs are occupied by CSI-RS. |
| firstOFDMSymbolInTimeDomain2 |
| Time domain allocation within a physical resource block. See TS 38.211, clause 7.4.1.5.3. |
| firstOFDMSymbolInTimeDomain |
| Time domain allocation within a physical resource block. The field indicates the first OFDM symbol in the PRB used for CSI-RS. See TS 38.211, clause 7.4.1.5.3. Value 2 is supported only when DL-DMRS-typeA-pos equals 3. |
| freqBand |
| Wideband or partial band CSI-RS, (see TS 38.214, clause 5.2.2.3.1) |
| frequencyDomainAllocation |
| Frequency domain allocation within a physical resource block in accordance with TS 38.211, clause 7.4.1.5.3. The applicable row number in table 7.4.1.5.3-1 is determined by the frequencyDomainAllocation for rows 1, 2 and 4, and for other rows by matching the values in the column Ports, Density and CDMtype in table 7.4.1.5.3-1 with the values of nrofPorts, cdm-Type and density below and, when more than one row has the 3 values matching, by selecting the row where the column (k bar, 1 bar) in table 7.4.1.5.3-1 has indexes for k ranging from 0 to 2*n-1 where n is the number of bits set to 1 in frequencyDomainAllocation. |
| nrofPorts |
| Number of ports (see TS 38.214, clause 5.2.2.3.1) |

CSI-FrequencyOccupation

FIG. 9 illustrates the CSI-FrequencyOccupation IE. The CSI-FrequencyOccupation IE is used to configure the frequency domain occupation of a channel state information measurement resource (e.g., NZP-CSI-RS-Resource, CSI-IM-Resource). Fields for the CSI-FrequencyOccupation IE are further described in Table 6 below.

TABLE 6

| CSI-FrequencyOccupation field descriptions |
| --- |
| nrofRBs<br>Number of PRBs across which this CSI resource spans. Only multiples of 4 are allowed. The smallest configurable number is the minimum of 24 and the width of the associated BWP. If the configured value is larger than the width of the corresponding BWP, the UE shall assume that the actual CSI-RS bandwidth is equal to the width of the BWP. |
| startingRB<br>PRB where this CSI resource starts in relation to common resource block #0 (CRB#0) on the common resource block grid. Only multiples of 4 are allowed (0, 4, . . .) |

Problems with Existing Solutions

There currently exist certain challenge(s). In NR, in connected mode, a UE is provided either with periodic, semi-periodic or aperiodic CSI-RS/TRS (TRS or CSI RS for tracking) so it can measure the channel qualities, and/or track the reference signal in order to fine tune its time and frequency synchronization. Such RSs may also not be turned off despite some individual UEs may be in Idle/Inactive states. Nevertheless, the UE is not aware of the potential existence of such RSs during the RRC_Idle/Inactive. As such the UE conventionally relies on SSB signals during RRC_Idle/Inactive for, e.g., Automatic Gain Control (AGC) setting, synchronization, and/or cell quality measurements.

The problem with SSB measurements is that SSBs come in long time intervals (e.g., 20 ms) and sometimes the UE may need to stay out of deep sleep for an extended time before it is able to, e.g., read its paging message after the previous available SSB reception, which leads to a waste of UE energy.

Exposing CSI-RSs for tracking or TRSs that are available during RRC_Connected to RRC_Idle is considered as a solution to help the UE reduce the power consumption during RRC_Idle/Inactive. In particular, provision of such information via System Information (SI) (e.g., a SI Block (SIB), such as SIB1, SIB2, . . . SIBn) is considered as a viable mechanism. Nevertheless, this involves a large overhead on the network side and also occupies a large part of the SI if the TRS configuration follows the same approach as Rel-15/16. In general, TRS configuration in the current versions of Rel-15/16 includes several parameters having configurations which are always the same. Nevertheless, TRS configuration needs to be explicitly configured, since it follows the same approach as other types of CSI-RSs for configuration.

SUMMARY

Methods of compact Tracking Reference Signal (TRS) configuration for New Radio (NR) User Equipment (UE) are provided. The Channel State Information Reference Signal (CSI-RS) configuration framework through which the TRS is traditionally configured in connected mode is quite hefty in terms of number of possibilities and Information Elements (IEs) included in its structures. It entails IEs that can be used for configuration of multiple sets (up to 16) of both Zero Power (ZP) and Non-zero Power (NZP) CSI-RSs. Each of these sets can itself include configuration of up to 64 resources.

In order to be able to provide TRS configuration and availability information to the UEs in Radio Resource Control (RRC) Idle/Inactive states, a compact TRS mechanism is disclosed through which the network can configure the UE with specific TRSs. Further, this approach can indicate to the UE if the configured RS is applicable to all RRC states (e.g., connected, idle, or inactive), or to specific RRC states. Specifically, the present disclosure provides mechanisms with which different configuration parameters are needed to be set to configure the UE with a compact TRS. Furthermore, the disclosure provides methods and mechanisms with which the UE can communicate its capabilities or provide assistance information to the network, in order to configure the UE with a proper compact TRS.

In this regard, embodiments described herein provide UEs with a mechanism to be configured efficiently with a compact TRS. The compact TRS removes the redundant parts of a traditional TRS while providing flexibility for the network to further expose the TRS to idle UEs. Embodiments exploit the compact TRS to achieve power savings particularly during RRC_Idle/Inactive modes. Furthermore, the compact TRS significantly reduces the network overhead in configuring the TRS.

There are, proposed herein, various embodiments which address one or more of the issues disclosed herein. In some embodiments, a method performed by a wireless device for compactly configuring a TRS IE is provided. The method comprises: receiving a compact TRS IE from higher layer signaling of a network, wherein the compact TRS IE is received without a CSI-RS configuration; and configuring at least one TRS in accordance with the compact TRS IE.

In some embodiments, the compact TRS IE is available in idle/inactive mode or connected mode.

In some embodiments, the compact TRS IE is received when the wireless device is in one of an idle mode or an inactive mode. In some embodiments, the compact TRS IE is received through at least one of a System Information (SI), a RRC configuration, or a RRC release. In some embodiments, the wireless device exploits the compact TRS IE to save power during the idle mode or the inactive mode. In some embodiments, configuring the at least one TRS in accordance with the compact TRS IE comprises configuring a frequency location of TRS occasions within an initial bandwidth part (BWP) of the idle mode or the inactive mode. In some embodiments, configuring the at least one TRS in accordance with the compact TRS IE comprises configuring a frequency location of TRS occasions such that the TRS occasions are not restricted by an initial BWP of the idle mode or the inactive mode.

In some embodiments, configuring the at least one TRS in accordance with the compact TRS IE comprises configuring Quasi Co-Location (QCL) information for the at least one TRS from a higher layer qcl-InfoPeriodicCSI-RS configuration.

In some embodiments, configuring the at least one TRS in accordance with the compact TRS IE comprises configuring QCL information for the at least one TRS based on an associated Synchronization Signal Block (SSB).

In some embodiments, the method further comprises providing capability signaling indicating a capability of the wireless device to exploit the compact TRS IE.

In some embodiments, the method further comprises providing compact TRS configuration assistance information. In some embodiments, providing the compact TRS configuration assistance information comprises indicating a preference for parameters to be included in the compact TRS IE. In some embodiments, providing the compact TRS configuration assistance information comprises indicating at least one preferred compact TRS configuration.

In some embodiments, the method further comprises deploying the at least one TRS for a measurement and/or tracking purpose.

In some embodiments, the compact TRS IE comprises the following parameters: powerControlOffsetSS, scramblingID, firstOFDMSymbolInTimeDomain, startingRB, and nrofRBs. In some embodiments, the compact TRS IE optionally comprises one or more of the following parameters: periodicityAndOffset, aperiodicTriggeringOffset or qcl-InfoPeriodicCSI-RS.

In some embodiments, the compact TRS IE omits one or more of the following parameters: bwp-Id, resource Type, repetition, aperiodicTriggeringOffset, trs-Info, powerControlOffset, frequencyDomainAllocation, nrofPorts, firstOFDMSymbolInTimeDomain2, cdm-Type, or density.

In some embodiments, the compact TRS IE omits each of the following parameters: bwp-Id, resourceType, repetition, trs-Info, powerControlOffset, frequencyDomainAllocation, nrofPorts, firstOFDMSymbolInTimeDomain2, cdm-Type, and density.

In some embodiments, the compact TRS IE comprises a TRS-Config IE.

In some embodiments, the compact TRS IE comprises a CSI-RS-for-tracking-Resource IE.

In some embodiments, a wireless device for compactly configuring a TRS is provided. The wireless device comprises processing circuitry configured to perform any of the steps of any of the above embodiments.

In some embodiments, a method performed by a network node for compactly configuring a TRS is provided. The method comprises: determining at least one TRS configuration for a wireless device; and providing a compact TRS IE to the wireless device in accordance with the at least one TRS configuration, wherein the compact TRS IE is provided without providing a CSI-RS configuration.

In some embodiments, the network node considers common preferred parameter configurations from mobile devices when the compact TRS IE is provided through SI or broadcast to a plurality of mobile devices.

In some embodiments, the method further comprises: receiving capability signaling indicating a capability of the wireless device to exploit the compact TRS IE; and determining the at least one TRS configuration in response to receiving the capability signaling.

In some embodiments, the method further comprises: receiving compact TRS configuration assistance information; and determining the at least one TRS configuration in accordance with the capability signaling. In some embodiments, the compact TRS configuration assistance information comprises a preference for parameters to be included in the compact TRS IE. In some embodiments, the compact TRS configuration assistance information comprises at least one preferred compact TRS configuration.

In some embodiments, a network node for compactly configuring a TRS is provided.

The network node comprises processing circuitry configured to perform any of the steps of any of the above embodiments.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 1 illustrates a NZP-CSI-RS-Resource Information Element (IE).

FIG. 2 illustrates a NZP-CSI-RS-ResourceId IE.

FIG. 3 illustrates a NZP-CSI-RS-ResourceSet IE.

FIG. 4 illustrates a NZP-CSI-RS-ResourceSetId IE.

FIG. 5 illustrates a CSI-ResourceConfig IE.

FIG. 6 illustrates a CSI-ResourceConfigId IE.

FIG. 7 illustrates a CSI-ResourcePeriodicityAndOffset IE.

FIG. 8 illustrates a CSI-RS-ResourceMapping IE.

FIG. 9 illustrates a CSI-FrequencyOccupation IE.

FIG. 11 illustrates an example of a TRS-Config IE.

FIG. 12 illustrates a more compact example of the TRS-Config IE when a Bandwidth Part (BWP) is the same as the initial BWP for a User Equipment (UE).

DETAILED DESCRIPTION

Figure 10:
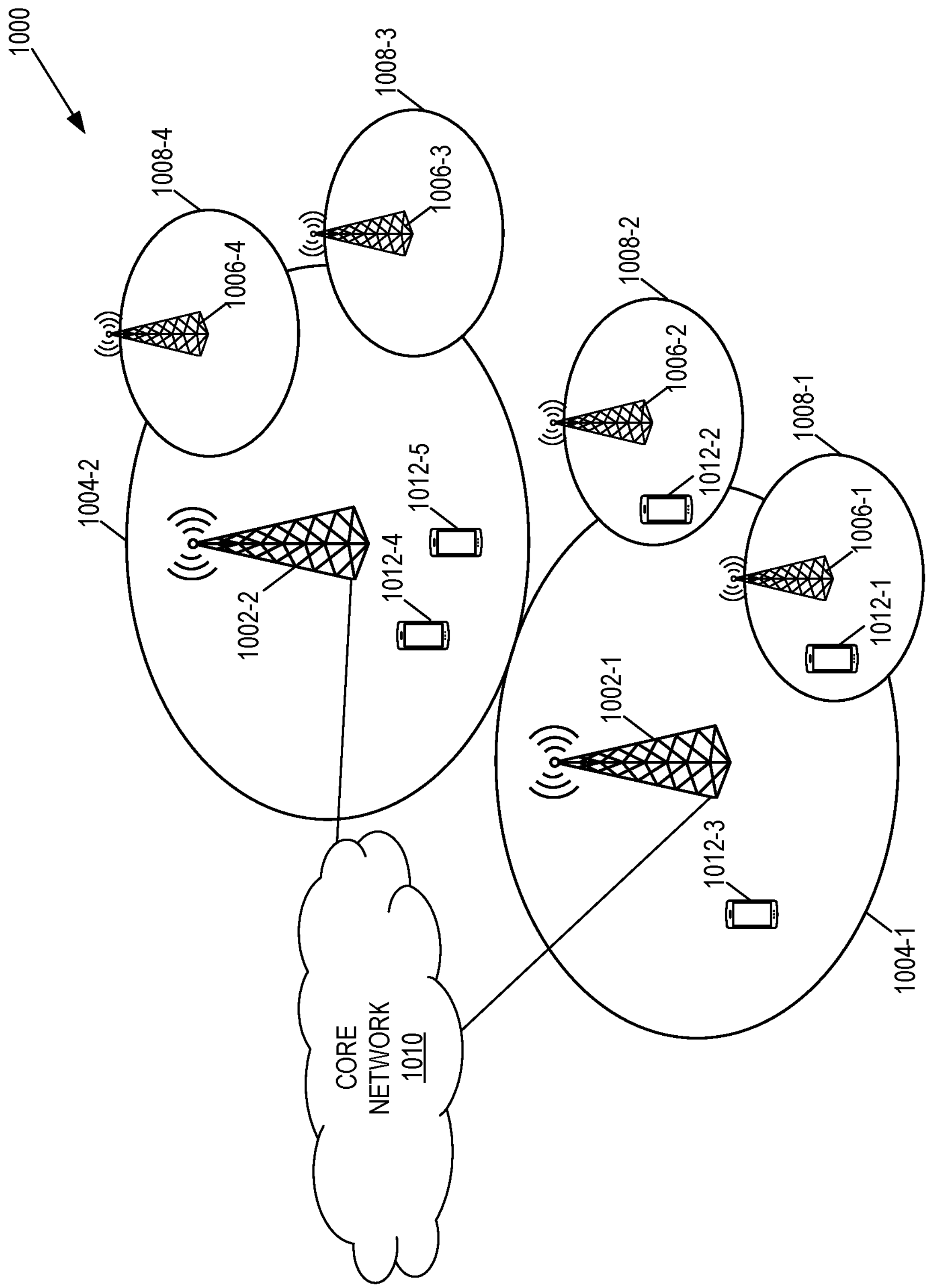
FIG. 10 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

FIG. 10 illustrates one example of a cellular communications system 1000 in which embodiments of the present disclosure may be implemented. In the embodiments described herein, the cellular communications system 1000 is a 5G System (5GS) including a NR RAN or LTE RAN (i.e., Evolved Universal Terrestrial Radio Access (E-UTRA) RAN) or an Evolved Packet System (EPS) including a LTE RAN. In this example, the RAN includes base stations 1002-1 and 1002-2, which in LTE are referred to as eNBs (when connected to Evolved Packet Core (EPC)) and in 5G NR are referred to as gNBs (e.g., LTE RAN nodes connected to 5G Core (5GC), which are referred to as gn-eNBs), controlling corresponding (macro) cells 1004-1 and 1004-2. The base stations 1002-1 and 1002-2 are generally referred to herein collectively as base stations 1002 and individually as base station 1002. Likewise, the (macro) cells 1004-1 and 1004-2 are generally referred to herein collectively as (macro) cells 1004 and individually as (macro) cell 1004. The RAN may also include a number of low power nodes 1006-1 through 1006-4 controlling corresponding small cells 1008-1 through 1008-4. The low power nodes 1006-1 through 1006-4 can be small base stations (such as pico or femto base stations) or Remote Radio Heads (RRHs), or the like. Notably, while not illustrated, one or more of the small cells 1008-1 through 1008-4 may alternatively be provided by the base stations 1002. The low power nodes 1006-1 through 1006-4 are generally referred to herein collectively as low power nodes 1006 and individually as low power node 1006. Likewise, the small cells 1008-1 through 1008-4 are generally referred to herein collectively as small cells 1008 and individually as small cell 1008. The cellular communications system 1000 also includes a core network 1010, which in the 5GS is referred to as the 5G Core (5GC). The base stations 1002 (and optionally the low power nodes 1006) are connected to the core network 1010.

The base stations 1002 and the low power nodes 1006 provide service to wireless communication devices 1012-1 through 1012-5 in the corresponding cells 1004 and 1008. The wireless communication devices 1012-1 through 1012-5 are generally referred to herein collectively as wireless communication devices 1012 and individually as wireless communication device 1012. In the following description, the wireless communication devices 1012 are oftentimes UEs, but the present disclosure is not limited thereto.

In embodiments described herein, methods and mechanisms are provided with which a network (e.g., a NR RAN of the cellular communications system 1000) can configure a UE (e.g., the wireless communication devices 1012) with one or multiple Tracking Resource Signals (TRSs) in a compact way. The underlying configuration can be performed through different mechanisms, such as a System Information (SI) update, Radio Resource Control (RRC) configuration, or RRC release command Furthermore, the compact TRS mechanisms described herein do not require reporting from the UE. For example, the UE can employ them for measurement and tracking purposes and do not need to provide feedback to the network.

Aspect 1: Compact TRS Configuration and Resource Mapping

Configuring a UE with a compact TRS involves several parameters. In one example, a specific NZP-CSI-RS-Resource can be configured for compact TRS (e.g., a TRS-config Information Element (IE) which includes the most relevant fields from CSI-RS-ResourceMapping as well as NZP-CSI-RS-Resourceset). Below, example embodiments are described on how the relevant parameters can be configured in a compact way.

NZP-CSI-RS-Resource IE

In one example, this IE can be simply called as a CSI-RS-for-tracking-Resource IE, or TRS-config IE clarifying that this is a compact TRS configuration.

nzp-CSI-RS-ResourceId

In one example, this parameter does not need to be explicitly configured, particularly if the compact TRS IE is configured as an independent NZP-CSI-RS-Resource IE as described above.

In another example, the parameter can be simply called in a relation to compact TRS configuration, clarifying that this is different from other types of Channel State Information Reference Signal (CSI-RS) configuration (e.g., TRS-config, or compact CSI-RS for tracking and so on).

resourceMapping

In one example, an independent CSI-RS-ResourceMapping IE for compact TRS can be configured. In another preferred approach, all the related resource mapping fields can be moved to the compact TRS IE.

powerControlOffset

Power offset of Physical Downlink Shared Channel (PDSCH) Resource Element (RE) to Non-Zero Power (NZP) CSI-RS RE. In one example, this field is removed from compact TRS configuration, since the UE is not expected to report anything after receiving TRS.

Power Control Offset Synchronization Signal (SS)

Power control offset SS is the ratio of NZP CSI-RS Energy Per Resource Element (EPRE) to the Secondary Synch Signal of SS/Physical Broadcast Channel (PBCH) block EPRE.

In one example, the ratio can be configured as 1 or 0 decibels (dB). In this case, in one approach the compact TRS may not include this IE indicating that the power control offset SS is configured as 1 to reduce the size. For example, if the compact TRS is present in idle mode, the network may wish to configure this parameter as 1 and thus do not explicitly configure it in compact TRS.

In another example, the value can be explicitly configured, or the value can be configured explicitly only when it is not 1. In yet another example, the UE may be configured differently for connected and idle modes (e.g., a higher or lower value for the connected mode, and 1 for idle mode).

Scrambling ID

In one example, the scrambling ID of compact TRS can be configured in the same way as in Rel-15/16.

In another example, the scrambling ID of compact TRS can be associated with the RRC state (e.g., for connected mode a different ID can be employed with respect to the one used in the idle mode).

In one aspect, the scrambling ID can be the same or based on Cell identity; in this case the field of scrambling ID can be omitted.

Periodicity and Offset

In one example, the compact TRS periodicity and offset is configured as in Rel-15/16, however, with a reduced number of possibilities (e.g., only the ones associated with periodicities of 10, 20, 40, or 80 ms or other values in terms of the number of slots). In another example, the periodicity can be configured explicitly from a set of values in terms of milliseconds (ms).

In another example, the compact TRS periodicity can be associated with a specific SS Block (SSB) periodicity, e.g., the same periodicity as SSB, or a fraction of SSB periodicity, or multiples of SSB periodicity. Furthermore, an offset indicator can indicate the offset between the compact TRS and SSB.

In another example, the compact TRS periodicity can be associated with a Paging Occasion (PO), or a number of POs. For example, the compact TRS periodicity may be configured to be every PO, or multiples of PO periodicity, or a fraction of it. Furthermore, an offset indicator can indicate the offset between the compact TRS and the PO.

In another example, the compact TRS periodicity can be associated with a Discontinuous Reception (DRX) cycle (e.g., Connected Mode DRX (C-DRX), Idle Mode DRX (I-DRX)), or a fraction of it, or multiple of it. Furthermore, an offset indicator can indicate the offset between the compact TRS and a specific part of the DRX cycle (e.g., the end of the cycle, the beginning of the cycle, or ON duration of C-DRX).

In another example, the compact TRS may be configured with separate periodicities for different RRC states. For example, the compact TRS periodicity may be shorter for connected mode, and longer for the idle mode, or vice-versa. Or it can be configured in a different way for the connected mode and idle mode. For example, the UE may be configured with a TRS of 40 ms periodicities for connected mode, but periodicity equivalence of a PO in idle mode.

qcl-InfoPeriodicCSI-RS

This parameter typically contains a reference to a TCI-State indicating Quasi Co-Location (QCL) source Reference Signal(s) (RS(s)) and QCL type(s). In one example, the same procedure as in Rel-15/16 can be employed for compact TRS.

In another example, particularly when the compact TRS is configured as part of SI update, or that the compact TRS is employed during idle mode, the QCL information can be configured in association with one or more specific SSBs. That is, the UE is configured to receive TRS in the same QCLs which are configured for the associated SSBs. Hence, there might be several TRSs provided in the cell, each associated with one/several of the SSBs provided in the cell.

Conditional Presence

In one example, this field remains in the same way as in Rel-15/16. That is, it can be present if the compact TRS configuration is periodic and absent if not or if there is also an aperiodic element (e.g., as in the case of Frequency Range 2 (FR2)).

In another example, this field is not configured at all in compact TRS, since there is a periodic element in all types of TRS configuration, and if the field aperiodic Triggering-Offset is also additionally configured, it indicates presence of the aperiodic element as well (e.g., as in the case of FR2).

In another example, this field can additionally indicate that the compact TRS configuration is applicable to which RRC states. For example, this field can indicate if the compact TRS configuration is applicable to both connected mode (e.g., RRC_Connected UEs) and idle mode UEs (e.g., RRC_Idle/Inactive UEs), or only applicable to connected mode UEs, or only applicable to an individual state or set of specific states. In a related realization, this part is only configured if the TRS configuration is applicable to Idle UEs as well, or in an alternative solution, if the field is absent, it is available to all RRC states. Furthermore, this field can also be configured with its different possibilities with regard to different RRC states as an independent field in compact TRS configuration IE.

NZP-CSI-RS-ResourceSet IE

In one example, all the fields in this IE can be moved to the generic compact TRS configuration. Otherwise, it can become an independent compact TRS set configuration IE (e.g., TRS-config-set IE).

nzp-CSI-RS-ResourceId

In one example, this parameter does not need to be explicitly configured, particularly if the compact TRS IE is configured as an independent NZP-CSI-RS-Resource IE as described above.

In another example, the parameter can be simply called in a relation to compact TRS configuration, clarifying that this is different from other types of CSI-RS configuration (e.g., TRS-config, or compact CSI-RS for tracking and so on).

repetition

In one example, this field is removed and not configured for compact TRS configuration as there is no reporting expected for TRS.

trs-Info

In one example, this field is not configured for compact TRS configuration, since it is clear that the configuration is related to TRS.

aperiodicTriggeringOffset

In one example, this field is only configured if the compact TRS involves an aperiodic component as in the case of TRS for FR2. The configuration can be as in the case of Rel-15/16. If the field is not present, the UE assumes that all the parameters are periodic.

In case the compact TRS is only provided for idle UEs, the aperiodicTriggeringOffset is completely omitted for the structure pointed out in compact TRS configuration.

bwp-Id bwp-Id is currently configured as part of the CSI-ResourceConfig IE in Rel-15/16. In one example, the bwp-Id and Bandwidth (BW) related configurations can be moved under the compact TRS configuration IE. Another option is to make a specific compact TRS resource configuration, and include this field there. The following examples can be adapted to both possibilities.

In one example, the TRS is configured with a specific Bandwidth Part (BWP) among the ones which are configured for a specific cell. In such case, through a bwp-Id, the BWP (and associated subcarrier spacing) in which the TRS is provided is identified by the UE. In another example, particularly if the TRS is intended to be employed during idle mode, the UE can be configured with the same BWP as it is supposed to employ during idle mode. For example, the UE may be configured with the initial BWP during idle mode, and the same BWP can be configured for the compact TRS. As such, in one approach, the associated IE related to BWP configuration (e.g., bwp-Id) can remain optional, meaning if omitted the UE should assume the same BWP as idle mode for the TRS.

Similarly, the information about BW of the TRS available in a BWP can optionally be provided to the UE. The reason for the optionality of this IE is that typically the TRS is intended for wideband transmission and covers the whole BWP (e.g., 52 Resource Blocks (RBs) as described above). However, in case the initial BWP accommodates more than 52 RBs (e.g., 96 RBs in 15 KHz subcarrier spacing case) such optional indicator can be used to inform the UE whether the TRS covers the whole BWP (in this case 96 RBs) or only the default 52 RBs, or potentially an even smaller number of resource blocks (e.g., corresponding to SSB bandwidth).

Yet in another example, the UE may be configured with the same BWP or a subset of BWP for TRS which is configured for SSB. For example, an IE can be added to the compact TRS configuration related to BWP which indicates the BWP is associated with a specific SSB meaning it is the same BWP as the specific SSB.

UEs in Idle/Inactive mode may not need to operate on bandwidth larger than the bandwidth corresponding to initial BWP or the bandwidth of Coreset 0 (e.g., if there is no initial DL BWP). Thus, in yet another example, the UE may assume the TRS is transmitted in Physical RBs (PRBs) corresponding to a reference bandwidth or set of PRBs. The reference bandwidth can be the SSB bandwidth, the bandwidth corresponding to Coreset 0 or the bandwidth corresponding to initial BWP. In cases where the network may indicate an initial BWP in SI (e.g., a SI Block (SIB) such as SIB1), UEs in Idle/Inactive mode can assume that the TRS are present only in a subset of PRBs of the initial BWP—this subset of PRBs can be explicitly indicated via the BW field in the TRS configuration, or implicit indication (default can be the PRBs to the bandwidth corresponding to Coreset 0). This enables the network to keep the frequency span of the TRS to be as small as possible for the purpose of aiding the Idle/Inactive mode UEs. The frequency location and span of the TRS as well as the starting RB and the number of RBs can be provided as part of the configuration (e.g., in the element freqBand as part of an independent compact TRS resource mapping IE) or directly as part of the compact TRS configuration IE.

CSI-RS-ResourceMapping

In one example, all the fields in this IE can be moved to the generic compact TRS configuration. Otherwise, it can become an independent compact TRS set resource mapping configuration IE (e.g., TRS-config-ResourceMapping IE).

frequencyDomainAllocation

In one example, this field is not configured as part of compact TRS IE, or in another word is not included, since for TRS, it is always related to Rel-15/16 specifications associated with a case of no-Consolidated Data Model (CDM), number of ports 1 and density of 3 (e.g., row 1 of 3GPP Technical Specification TS 38.211 of Table 7.4.1.5.3-1).

Number of Ports

In one example, the compact TRS does not include the number of ports, since TRS is only associated with one port, and it is the same among all the underlying RS resources.

Cdm-Type

In one example, for compact TRS, there is no CDM and thus this line is not configured for the compact TRS. In other words, there is no need to consider CDM-type as part of the compact TRS configuration, and the UE by default assumes there is no CDM type configured.

Density density defines CSI-RS frequency density of each CSI-RS port per PRB, and CSI-RS PRB offset in case of the density value of ½. For the compact TRS, in one example, the density is always the same, and determined by the specification (e.g., density of 3), and thus this field does not need to be explicitly configured for the compact TRS.

firstOFDMSymbolInTimeDomain

When it comes to density in time, the TRS resources are always separated by 4 symbols and do not need to be signaled. However, the starting symbol in time indicated by firstOFDMSymbolInTimeDomain can be configured (e.g., it can be one of the values {4, 5, 6} for Frequency Range 1 (FR1) and FR2, or additional values for starting symbol can be included for FR2 {0, 1, 2, 3, 7, 8, 9}).

freqBand

This parameter is responsible for determining the number of RBs as well as the starting RB.

FIGS. 11 and 12 provide examples of how a compact TRS configuration IE can appear, with its elements as described in Aspect 1. FIG. 11 illustrates an example of the TRS-Config IE. FIG. 12 illustrates a more compact example of the TRS-Config IE when the BWP is the same as the initial BWP for the UE.

Aspect 2: UE Capability Signaling and Assistance Information for Compact TRS

In one example, the UE indicates to the network through capability signaling that it can support compact TRS. In another approach, the UE indicates to the network that it can exploit TRS for other purposes than tracking, such as to achieve power savings (e.g., in the idle mode).

The network then decides to configure or not the UE with a compact TRS as disclosed in Aspect 1.

In one example, the UE provides additional assistance information than just capability. For example, the UE provides preferences with regard to the underlaying parameters of compact TRS discussed in Aspect 1, or a subset of them. In a related realization, the UE may decide to even communicate a specific preferred compact TRS configuration or a set of specific TRS configurations.

The network can then decide to consider the UE preferences and configure the UE with one or more compact TRSs as such. In a related realization, particularly when the compact TRS is configured through SI, or when TRS is broadcasted to all the UEs, the network can consider the most common preferred parameter configurations from the UEs.

Figure 13:
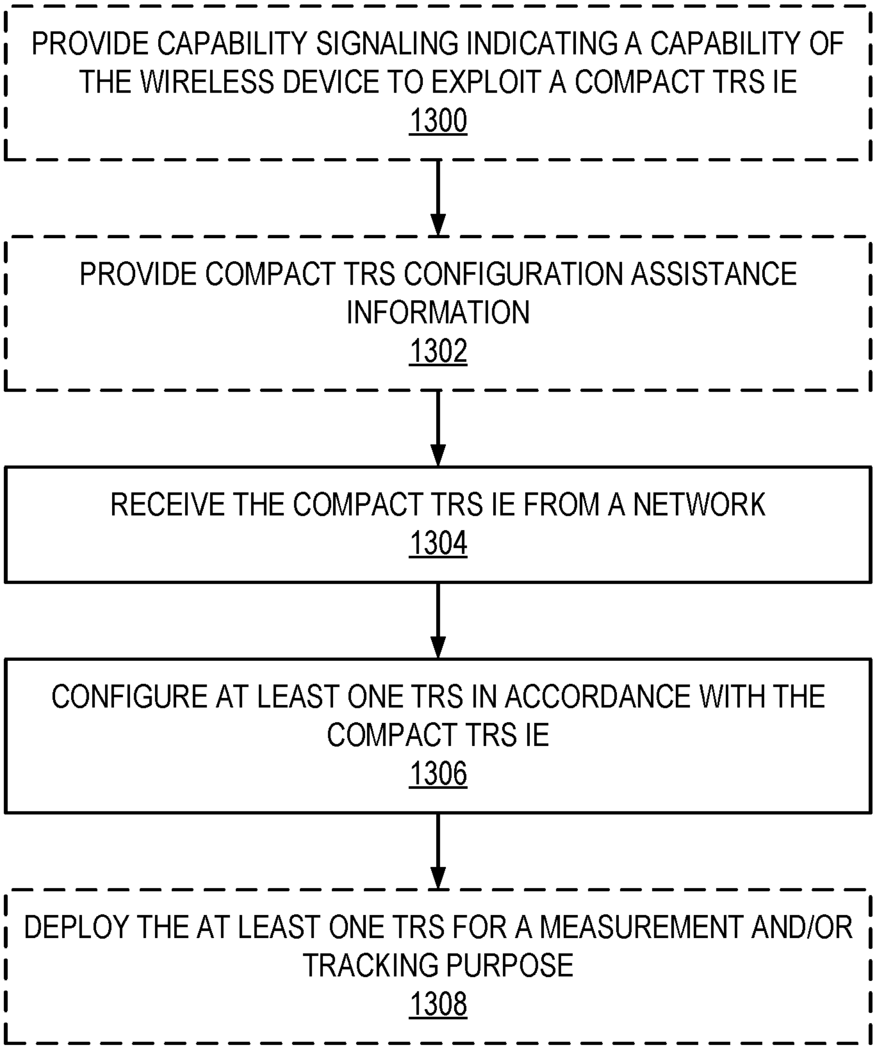
FIG. 13 is a flowchart illustrating a method for compactly configuring a Tracking Reference Signal (TRS) in accordance with one embodiment.

FIG. 13 is a flowchart illustrating a method for compactly configuring a TRS in accordance with one embodiment. The method may be implemented in a wireless device. Optional steps are indicated with dashed lines. In optional step 1300, the wireless device provides capability signaling indicating a capability of the wireless device to exploit a compact TRS IE. In optional step 1302, the wireless device provides compact TRS configuration assistance information. In step 1304, the wireless device receives the compact TRS IE from a network. In an exemplary aspect, the compact TRS IE is received without a CSI-RS configuration. In step 1306, the wireless device configures at least one TRS in accordance with the compact TRS IE. In optional step 1308, the wireless device deploys the at least one TRS for a measurement and/or tracking purpose.

Figure 14:
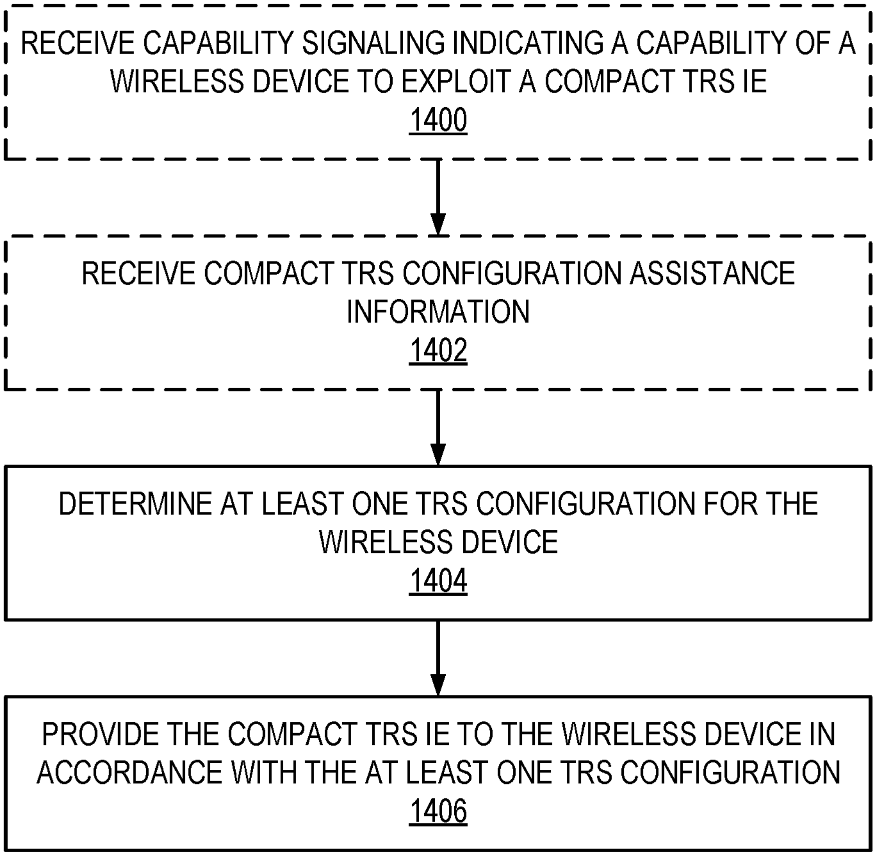
FIG. 14 is a flowchart illustrating a method for providing a compact TRS configuration in accordance with one embodiment.

FIG. 14 is a flowchart illustrating a method for providing a compact TRS configuration in accordance with one embodiment. The method may be implemented in a base station. Optional steps are indicated with dashed lines. In optional step 1400, the base station receives capability signaling indicating a capability of a wireless device to exploit a compact TRS IE. In optional step 1402, the base station receives compact TRS configuration assistance information. In step 1404, the base station determines at least one TRS configuration for the wireless device. In step 1406, the base station provides the compact TRS IE to the wireless device in accordance with the at least one TRS configuration. In an exemplary aspect, the compact TRS IE is provided without providing a CSI-RS configuration.

Figure 15:
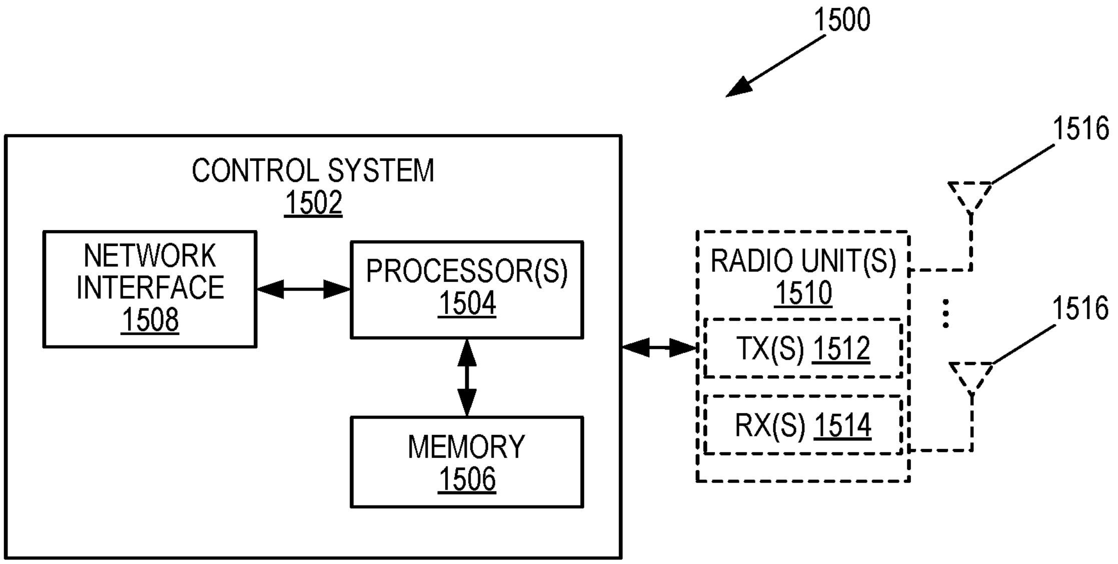
FIG. 15 is a schematic block diagram of a network node according to some embodiments of the present disclosure.

FIG. 15 is a schematic block diagram of a network node 1500 according to some embodiments of the present disclosure. Optional features are represented by dashed boxes. The network node 1500 may be, for example, a base station 1002 or 1006 or another network node that implements all or part of the functionality of the base station 1002 or gNB described herein. As illustrated, the network node 1500 includes a control system 1502 that includes one or more processors 1504 (e.g., Central Processing Units (CPUs), Application Specific Integrated Circuits (ASICs), Field Programmable Gate Arrays (FPGAs), and/or the like), memory 1506, and a network interface 1508. The one or more processors 1504 are also referred to herein as processing circuitry. In addition, the network node 1500 may include one or more radio units 1510 that each includes one or more transmitters 1512 and one or more receivers 1514 coupled to one or more antennas 1516. The radio units 1510 may be referred to or be part of radio interface circuitry. In some embodiments, the radio unit(s) 1510 is external to the control system 1502 and connected to the control system 1502 via, e.g., a wired connection (e.g., an optical cable). However, in some other embodiments, the radio unit(s) 1510 and potentially the antenna(s) 1516 are integrated together with the control system 1502. The one or more processors 1504 operate to provide one or more functions of a network node 1500 as described herein. In some embodiments, the function(s) are implemented in software that is stored, e.g., in the memory 1506 and executed by the one or more processors 1504.

Figure 16:
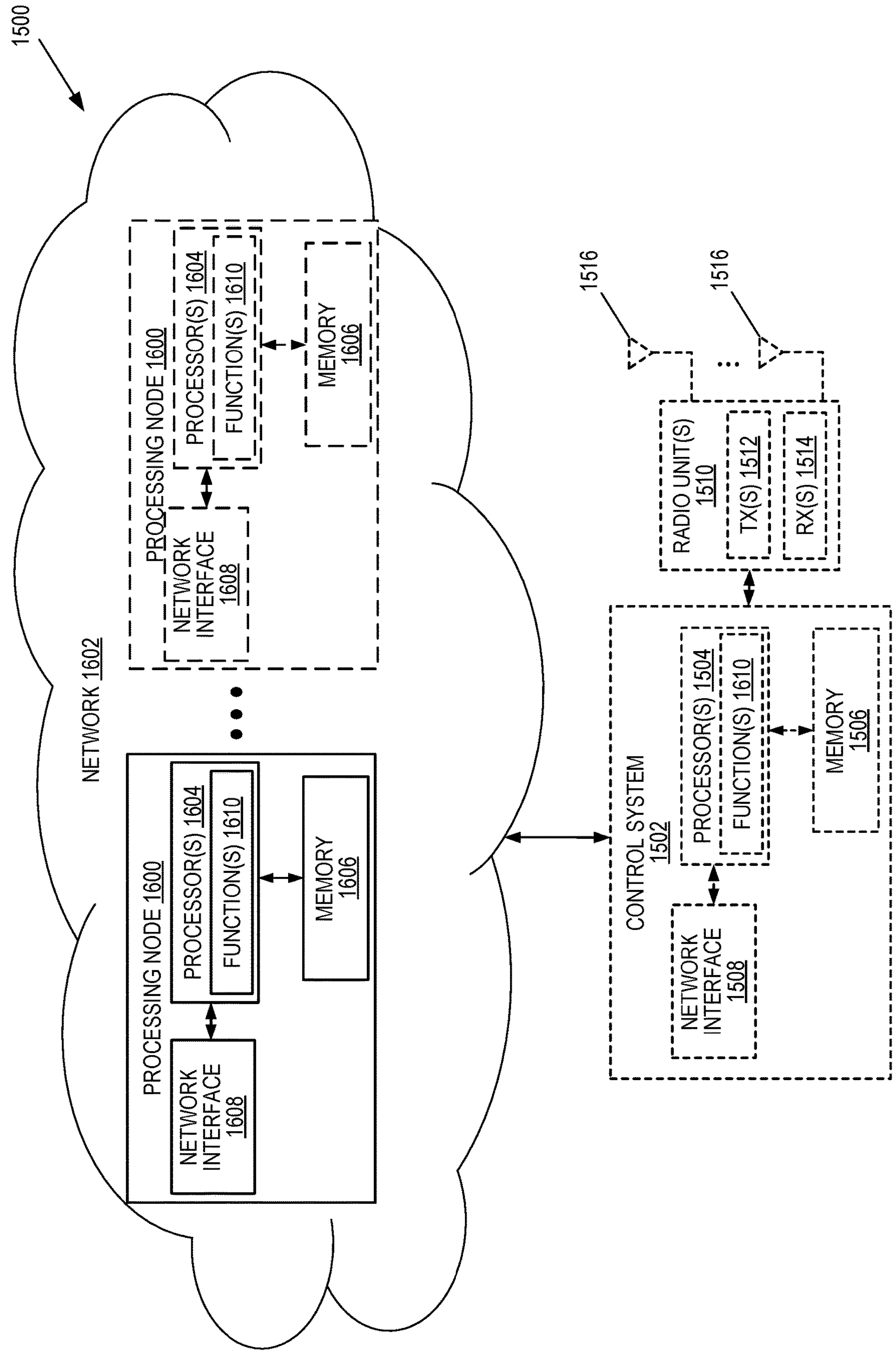
FIG. 16 is a schematic block diagram that illustrates a virtualized embodiment of the network node according to some embodiments of the present disclosure.

FIG. 16 is a schematic block diagram that illustrates a virtualized embodiment of the network node 1500 according to some embodiments of the present disclosure. This discussion is equally applicable to radio access nodes and other types of network nodes. Further, other types of network nodes may have similar virtualized architectures. Again, optional features are represented by dashed boxes.

As used herein, a "virtualized" network node is an implementation of the network node 1500 in which at least a portion of the functionality of the network node 1500 is implemented as a virtual component(s) (e.g., via a virtual machine(s) executing on a physical processing node(s) in a network(s)). As illustrated, in this example, the network node 1500 may include the control system 1502 and/or the one or more radio units 1510, as described above. The control system 1502 may be connected to the radio unit(s) 1510 via, for example, an optical cable or the like. The network node 1500 includes one or more processing nodes 1600 coupled to or included as part of a network(s) 1602. If present, the control system 1502 or the radio unit(s) are connected to the processing node(s) 1600 via the network 1602. Each processing node 1600 includes one or more processors 1604 (e.g., CPUs, ASICs, FPGAs, and/or the like), memory 1606, and a network interface 1608.

In this example, functions 1610 of the network node 1500 described herein are implemented at the one or more processing nodes 1600 or distributed across the one or more processing nodes 1600 and the control system 1502 and/or the radio unit(s) 1510 in any desired manner. In some particular embodiments, some or all of the functions 1610 of the network node 1500 described herein are implemented as virtual components executed by one or more virtual machines implemented in a virtual environment(s) hosted by the processing node(s) 1600. As will be appreciated by one of ordinary skill in the art, additional signaling or communication between the processing node(s) 1600 and the control system 1502 is used in order to carry out at least some of the desired functions 1610. Notably, in some embodiments, the control system 1502 may not be included, in which case the radio unit(s) 1510 communicate directly with the processing node(s) 1600 via an appropriate network interface(s).

In some embodiments, a computer program including instructions which, when executed by at least one processor, causes the at least one processor to carry out the functionality of the network node 1500 or a node (e.g., a processing node 1600) implementing one or more of the functions 1610 of the network node 1500 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
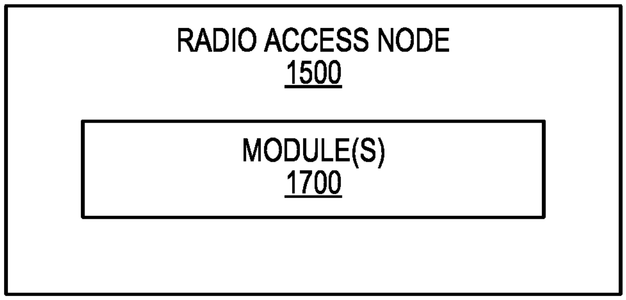
FIG. 17 is a schematic block diagram of the network node according to some other embodiments of the present disclosure.

FIG. 17 is a schematic block diagram of the network node 1500 according to some other embodiments of the present disclosure. The network node 1500 includes one or more modules 1700, each of which is implemented in software. The module(s) 1700 provide the functionality of the network node 1500 described herein. This discussion is equally applicable to the processing node 1600 of FIG. 16 where the modules 1700 may be implemented at one of the processing nodes 1600 or distributed across multiple processing nodes 1600 and/or distributed across the processing node(s) 1600 and the control system 1502.

Figure 18:
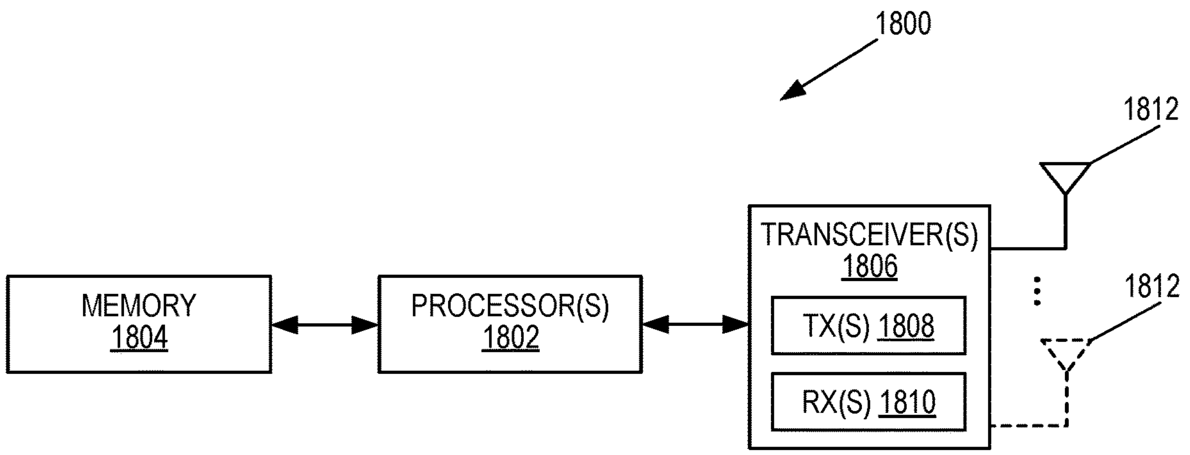
FIG. 18 is a schematic block diagram of a wireless communication device according to some embodiments of the present disclosure.

FIG. 18 is a schematic block diagram of a wireless communication device 1800 according to some embodiments of the present disclosure. As illustrated, the wireless communication device 1800 includes one or more processors 1802 (e.g., CPUs, ASICs, FPGAs, and/or the like), memory 1804, and one or more transceivers 1806 each including one or more transmitters 1808 and one or more receivers 1810 coupled to one or more antennas 1812. The transceiver(s) 1806 includes radio-front end circuitry connected to the antenna(s) 1812 that is configured to condition signals communicated between the antenna(s) 1812 and the processor(s) 1802, as will be appreciated by on of ordinary skill in the art. The processors 1802 are also referred to herein as processing circuitry. The transceivers 1806 are also referred to herein as radio circuitry. In some embodiments, the functionality of the wireless communication device 1800 described above may be fully or partially implemented in software that is, e.g., stored in the memory 1804 and executed by the processor(s) 1802. Note that the wireless communication device 1800 may include additional components not illustrated in FIG. 18 such as, e.g., one or more user interface components (e.g., an input/output interface including a display, buttons, a touch screen, a microphone, a speaker(s), and/or the like and/or any other components for allowing input of information into the wireless communication device 1800 and/or allowing output of information from the wireless communication device 1800), a power supply (e.g., a battery and associated power circuitry), etc.

In some embodiments, a computer program including instructions which, when executed by at least one processor, causes the at least one processor to carry out the functionality of the wireless communication device 1800 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 19:
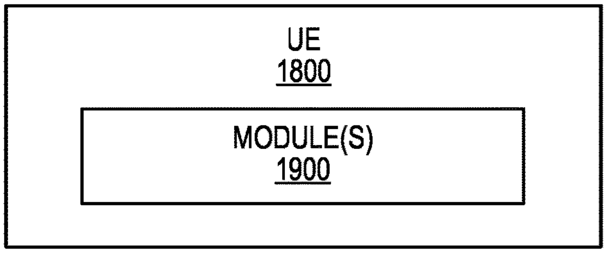
FIG. 19 is a schematic block diagram of the wireless communication device according to some other embodiments of the present disclosure.

FIG. 19 is a schematic block diagram of the wireless communication device 1800 according to some other embodiments of the present disclosure. The wireless communication device 1800 includes one or more modules 1900, each of which is implemented in software. The module(s) 1900 provide the functionality of the wireless communication device 1800 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like.

The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Group A Embodiments

Embodiment 1: A method performed by a wireless device for compactly configuring a TRS, the method comprising at least one of: receiving a compact TRS IE from a network; and configuring at least one TRS in accordance with the compact TRS IE.

Embodiment 2: The method of embodiment 1, wherein the compact TRS IE is available in idle mode and connected mode.

Embodiment 3: The method of any of embodiments 1 to 2, wherein the compact TRS IE is received through at least one of a SI, a RRC configuration, or a RRC release.

Embodiment 4: The method of any of embodiments 1 to 3, further comprising providing capability signaling indicating a capability of the wireless device to exploit the compact TRS IE.

Embodiment 5: The method of any of embodiments 1 to 4, further comprising providing compact TRS configuration assistance information.

Embodiment 6: The method of embodiment 5, wherein providing the compact TRS configuration assistance information comprises indicating a preference for parameters to be included in the compact TRS IE.

Embodiment 7: The method of any of embodiments 5 to 6, wherein providing the compact TRS configuration assistance information comprises indicating at least one preferred compact TRS configuration.

Embodiment 8: The method of any of embodiments 1 to 7, further comprising deploying the at least one TRS for a measurement and/or tracking purpose.

Embodiment 9: The method of any of embodiments 1 to 8, wherein the compact TRS IE comprises a TRS-Config IE.

Embodiment 10: The method of any of embodiments 1 to 9, wherein the compact TRS IE comprises a CSI-RS-for-tracking-Resource IE.

Embodiment 11: The method of any of the previous embodiments, further comprising: providing user data; and forwarding the user data to a host computer via transmission to the base station.

Group B Embodiments

Embodiment 12: A method performed by a base station for compactly configuring a TRS, the method comprising at least one of: determining at least one TRS configuration for a wireless device; and providing a compact TRS IE to the wireless device in accordance with the at least one TRS configuration.

Embodiment 13: The method of embodiment 12, wherein the compact TRS IE is available when the wireless device is in idle mode and connected mode.

Embodiment 14: The method of any of embodiments 12 to 13, wherein the compact TRS IE is provided through at least one of a SI, a RRC configuration, or a RRC release.

Embodiment 15: The method of embodiment 14, wherein the network considers common preferred parameter configurations from mobile devices when the compact TRS IE is provided through SI or broadcast to a plurality of mobile devices.

Embodiment 16: The method of any of embodiments 12 to 15, further comprising: receiving capability signaling indicating a capability of the wireless device to exploit the compact TRS IE; and determining the at least one TRS configuration in response to receiving the capability signaling.

Embodiment 17: The method of any of embodiments 12 to 16, further comprising: receiving compact TRS configuration assistance information; and determining the at least one TRS configuration in accordance with the capability signaling.

Embodiment 18: The method of embodiment 17, wherein the compact TRS configuration assistance information comprises a preference for parameters to be included in the compact TRS IE.

Embodiment 19: The method of any of embodiments 16 to 18, wherein the compact TRS configuration assistance information comprises at least one preferred compact TRS configuration.

Embodiment 20: The method of any of embodiments 12 to 19, wherein the compact TRS IE comprises a TRS-Config IE.

Embodiment 21: The method of any of embodiments 12 to 20, wherein the compact TRS IE comprises a CSI-RS-for-tracking-Resource IE.

Embodiment 22: The method of any of the previous embodiments, further comprising: obtaining user data; and forwarding the user data to a host computer or a wireless device.

Group C Embodiments

Embodiment 23: A wireless device for compactly configuring a TRS, the wireless device comprising: processing circuitry configured to perform any of the steps of any of the Group A embodiments; and power supply circuitry configured to supply power to the wireless device.

Embodiment 24: A base station for compactly configuring a TRS, the base station comprising: processing circuitry configured to perform any of the steps of any of the Group B embodiments; and power supply circuitry configured to supply power to the base station.

Embodiment 25: A UE for compactly configuring a TRS, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 26: A communication system including a host computer comprising: processing circuitry configured to provide user data; and a communication interface configured to forward the user data to a cellular network for transmission to a UE; wherein the cellular network comprises a base station having a radio interface and processing circuitry, the base station's processing circuitry configured to perform any of the steps of any of the Group B embodiments.

Embodiment 27: The communication system of the previous embodiment further including the base station.

Embodiment 28: The communication system of the previous 2 embodiments, further including the UE, wherein the UE is configured to communicate with the base station.

Embodiment 29: A method implemented in a communication system including a host computer, a base station, and a UE, the method comprising: at the host computer, providing user data; and at the host computer, initiating a transmission carrying the user data to the UE via a cellular network comprising the base station, wherein the base station performs any of the steps of any of the Group B embodiments.

Embodiment 30: The method of the previous embodiment, further comprising, at the base station, transmitting the user data.

Embodiment 31: A UE configured to communicate with a base station, the UE comprising a radio interface and processing circuitry configured to perform the method of the previous 3 embodiments.

Embodiment 32: A communication system including a host computer comprising: processing circuitry configured to provide user data; and a communication interface configured to forward user data to a cellular network for transmission to a UE; wherein the UE comprises a radio interface and processing circuitry, the UE's components configured to perform any of the steps of any of the Group A embodiments.

Embodiment 33: The communication system of the previous embodiment, wherein the cellular network further includes a base station configured to communicate with the UE.

Embodiment 34: A method implemented in a communication system including a host computer, a base station, and a UE, the method comprising: at the host computer, providing user data; and at the host computer, initiating a transmission carrying the user data to the UE via a cellular network comprising the base station, wherein the UE performs any of the steps of any of the Group A embodiments.

Embodiment 35: The method of the previous embodiment, further comprising at the UE, receiving the user data from the base station.

Embodiment 36: A communication system including a host computer comprising: communication interface configured to receive user data originating from a transmission from a UE to a base station; wherein the UE comprises a radio interface and processing circuitry, the UE's processing circuitry configured to perform any of the steps of any of the Group A embodiments.

Embodiment 37: The communication system of the previous embodiment, further including the UE.

Embodiment 38: The communication system of the previous 2 embodiments, further including the base station, wherein the base station comprises a radio interface configured to communicate with the UE and a communication interface configured to forward to the host computer the user data carried by a transmission from the UE to the base station.

Embodiment 39: A method implemented in a communication system including a host computer, a base station, and a UE, the method comprising: at the host computer, receiving user data transmitted to the base station from the UE, wherein the UE performs any of the steps of any of the Group A embodiments.

Embodiment 40: The method of the previous embodiment, further comprising, at the UE, providing the user data to the base station.

Embodiment 41: A communication system including a host computer comprising a communication interface configured to receive user data originating from a transmission from a UE to a base station, wherein the base station comprises a radio interface and processing circuitry, the base station's processing circuitry configured to perform any of the steps of any of the Group B embodiments.

Embodiment 42: The communication system of the previous embodiment further including the base station.

Embodiment 43: The communication system of the previous 2 embodiments, further including the UE, wherein the UE is configured to communicate with the base station.

Embodiment 44: A method implemented in a communication system including a host computer, a base station, and a UE, the method comprising: at the host computer, receiving, from the base station, user data originating from a transmission which the base station has received from the UE, wherein the UE performs any of the steps of any of the Group A embodiments.

Embodiment 45: The method of the previous embodiment, further comprising at the base station, receiving the user data from the UE.

Embodiment 46: The method of the previous 2 embodiments, further comprising at the base station, initiating a transmission of the received user data to the host computer.

Those skilled in the art will recognize improvements and modifications to the embodiments of the present disclosure. All such improvements and modifications are considered within the scope of the concepts disclosed herein.

The invention claimed is:

1. A method performed by a wireless device for compactly configuring a Tracking Reference Signal (TRS) Information Element (IE) the method comprising:
- receiving a compact TRS IE from higher layer signaling of a network, wherein the compact TRS IE is received without a Channel State Information Reference Signal (CSI-RS) configuration, wherein the compact TRS IE omits one or more of the following parameters: bwp-Id, resourceType, repetition, aperiodicTriggeringOffset, trs-Info, powerControlOffset, frequencyDomainAllocation, nrofPorts, firstOFDMSymbolInTimeDomain2, cdm-Type, or density; and
- configuring at least one TRS in accordance with the compact TRS IE, wherein configuring the at least one TRS in accordance with the compact TRS IE comprises configuring a frequency location of TRS occasions such that the TRS occasions are not restricted by an initial bandwidth part (BWP).

2. The method of claim 1, wherein the compact TRS IE is available in idle/inactive mode or connected mode.

3. The method of claim 1, wherein the compact TRS IE is received when the wireless device is in one of an idle mode or an inactive mode.

4. The method of claim 3, wherein the compact TRS IE is received through at least one of a System Information (SI) a Radio Resource Control (RRC) configuration, or a RRC release.

5. The method of claim 3, wherein the wireless device exploits the compact TRS IE to save power during the idle mode or the inactive mode.

6. The method of claim 3, wherein configuring the at least one TRS in accordance with the compact TRS IE comprises configuring a frequency location of TRS occasions within an initial bandwidth part (BWP) of the idle mode or the inactive mode.

7. The method of claim 1, wherein configuring the at least one TRS in accordance with the compact TRS IE comprises configuring Quasi Co-Location (QCL) information for the at least one.

8. The method of claim 1, further comprising providing capability signaling indicating a capability of the wireless device to exploit the compact TRS IE.

9. The method of claim 1, further comprising providing compact TRS configuration assistance information.

10. The method of claim 9, wherein providing the compact TRS configuration assistance information comprises indicating a preference for parameters to be included in the compact TRS IE.

11. The method of claim 9, wherein providing the compact TRS configuration assistance information comprises indicating at least one preferred compact TRS configuration.

12. The method of claim 1, further comprising deploying the at least one TRS for a measurement and/or tracking purpose.

13. The method of claim 1, wherein the compact TRS IE comprises the following parameters: powerControlOffsetSS, scramblingID, firstOFDMSymbolInTimeDomain, startingRB, and nrofRBs.

14. The method of claim 1, wherein the compact TRS IE comprises a TRS-Config IE or a CSI-RS-for-tracking-Resource IE.

15. A wireless device for compactly configuring a Tracking Reference Signal, TRS, the wireless device comprising:

transceiver circuitry;

processing circuitry, coupled to the transceiver circuitry, configured to perform operations comprising:

receiving a compact TRS IE from higher layer signaling of a network, wherein the compact TRS IE is received without a Channel State Information Reference Signal (CSI-RS) configuration; and configuring at least one TRS in accordance with the compact TRS IE, wherein configuring the at least one TRS in accordance with the compact TRS IE comprises configuring a frequency location of TRS occasions such that the TRS occasions are not restricted by an initial bandwidth part (BWP).

16. A method performed by a network node for providing a compact Tracking Reference Signal, TRS, configuration, the method comprising:

determining at least one TRS configuration for a wireless device; and providing a compact TRS Information Element, IE, to the wireless device in accordance with the at least one TRS configuration, wherein the compact TRS IE is provided without providing a Channel State Information Reference Signal (CSI-RS) configuration.

17. The method of claim 16, wherein the compact TRS IE is available when the wireless device is in idle mode and connected mode.

18. The method of claim 16, wherein the compact TRS IE is provided when the wireless device is in one of an idle mode or an inactive mode.

19. The method of claim 16, wherein the compact TRS IE is provided through at least one of a System Information, SI, a Radio Resource Control (RRC) configuration, or a RRC release.

* * * * *